United States Patent
Sawado

(10) Patent No.: US 8,427,612 B2
(45) Date of Patent: Apr. 23, 2013

(54) LIQUID CRYSTAL DEVICE AND ELECTRONIC APPARATUS

(75) Inventor: Ayae Sawado, Kai (JP)

(73) Assignee: Seiko Epson Corporation, Tokyo (JP)

( * ) Notice: Subject to any disclaimer, the term of this patent is extended or adjusted under 35 U.S.C. 154(b) by 108 days.

(21) Appl. No.: 13/078,292

(22) Filed: Apr. 1, 2011

(65) Prior Publication Data

US 2011/0242459 A1    Oct. 6, 2011

(30) Foreign Application Priority Data

Apr. 2, 2010 (JP) .................. 2010-085839
Jan. 31, 2011 (JP) .................. 2011-017625

(51) Int. Cl.
*G02F 1/1337* (2006.01)
(52) U.S. Cl.
USPC .......................................... 349/129
(58) Field of Classification Search .......... 349/129
See application file for complete search history.

(56) References Cited

U.S. PATENT DOCUMENTS 7,106,401 B2     9/2006  Hashimoto et al.
2004/0196418 A1* 10/2004  Hashimoto et al. ........... 349/113

FOREIGN PATENT DOCUMENTS

| JP | 3758612 B | 3/2006 |
| JP | 3758654 B | 3/2006 |
| JP | 4143922 B | 9/2008 |

* cited by examiner

*Primary Examiner* — Phu Vu
(74) *Attorney, Agent, or Firm* — ALG Intellectual Property, LLC

(57) ABSTRACT

A liquid crystal device includes a first substrate, a second substrate disposed to face the first substrate, a plurality of pixel electrodes arranged between the first substrate and the second substrate at intervals with each other, and a liquid crystal layer. The liquid crystal layer is interposed between the first substrate and the second substrate, and configured to include a vertical alignment liquid crystal. When the interval between the pixel electrodes adjacent to each other is s [μm], the thickness of the liquid crystal layer is d [μm] and the pretilt angle of the vertical alignment liquid crystal is θ[°], a relation equation $-1.6 \times s/d + 4.4 \leq \theta \leq -2.6 \times s/d + 5.6$ is satisfied.

7 Claims, 5 Drawing Sheets

LIQUID CRYSTAL DEVICE AND ELECTRONIC APPARATUS

Japanese Patent Application No. 2010-085839, filed Apr. 2, 2010 and Japanese Patent Application No. 2011-017625, filed Jan. 31, 2011 are incorporated by reference in its entirety herein.

BACKGROUND

1. Technical Field

The present invention relates to the technical field of a liquid crystal device and an electronic apparatus including the corresponding liquid crystal device.

2. Related Art

In a liquid crystal device that performs display in a hold mode, visually perceivable afterimages for humans are significantly viewed when a moving image is displayed, so that moving image blur (or moving image blurredness), in which the edge of the image of a moving object in a display image is blurredly viewed, occurs frequently compared with a display apparatus that performs display in an impulse mode, such as a Cathode Ray Tube (CRT).

Meanwhile, as this kind of liquid crystal device, a Vertical Alignment (VA)-type apparatus is known (for example, refer to Japanese Patent No. 3758612, Japanese Patent No. 3758654, and Japanese Patent No. 4143922).

For example, Japanese Patent No. 3758612, Japanese Patent No. 3758654, and Japanese Patent No. 4143922 disclose technique of improving the responsive performance of liquid crystal display device by applying a pretilt angle within a predetermined angle range to the vertical alignment liquid crystal material of a VA-type liquid crystal device.

In this kind of liquid crystal device, the brightness of a display image can be improved by reducing the interval between pixel electrodes adjacent to each other and enlarging area occupied by the pixel electrodes in the display area. However, as the interval between pixel electrodes adjacent to each other decrease, a transverse electric field generated between the pixel electrodes adjacent to each other increases, so that there is a fear of reduction in the response speed of liquid crystal positioned around the end portion of the pixel electrodes. Therefore, when the interval between pixel electrodes adjacent to each other is simply reduced, the brightness of a display image can be improved but there is a technical problem in that the above-described moving image blur may be increased.

Further, since the above-described technique disclosed in Japanese Patent No. 3758612, Japanese Patent No. 3758654, and Japanese Patent No. 4143922 is limited to a case where the thickness of a vertical alignment liquid crystal layer (that is, cell thickness) is equal to or less than 2 μm, there is a technical problem in that it is difficult to be applied to a case where the cell thickness is larger than 2 μm.

SUMMARY

An advantage of some aspects of the invention is to provide a liquid crystal device capable of improving the brightness of a display image and reducing moving image blur, and an electronic apparatus including such a liquid crystal device.

According to a first aspect of the invention, there is provided a liquid crystal device includes a first substrate; a second substrate disposed to face the first substrate; a plurality of pixel electrodes arranged on the first substrate at intervals with each other; and a liquid crystal layer interposed between the first substrate and the second substrate, and configured to include a vertical alignment liquid crystal. When an interval is s [μm], the thickness of the liquid crystal layer is d [μm], and the pretilt angle of the vertical alignment liquid crystal is $\theta[°]$, a relation equation $-1.6 \times s/d + 4.4 \leq \theta \leq -2.6 \times s/d + 5.6$ is satisfied.

In the liquid crystal device according to the first aspect of the invention, the liquid crystal layer is interposed between the first substrate and the second substrate, which are opposite to each other. The liquid crystal layer includes liquid crystal having Vertical Alignment (VA) liquid crystal, that is, liquid crystal having negative dielectric constant anisotropy. That is, the liquid crystal device according to the first aspect of the invention is a VA-type liquid crystal device. A plurality of pixel electrodes is arranged on the first substrate having an interval therebetween, for example, in a matrix form. A common electrode is provided on the second substrate such that, typically, the common electrode faces the plurality of pixel electrodes. When the liquid crystal device according to the first aspect of the invention is operated, voltage is applied between the pixel electrodes and the common electrode in response to an image signal. For example, an alignment film is provided on each of the first substrate and the second substrate, so that pretilt, inclined by a predetermined angle in a predetermined direction, is applied to liquid crystal molecules, included in the vertical alignment liquid crystal, by the corresponding alignment film. That is, the liquid crystal molecules included in the vertical alignment liquid crystal are aligned in such a way that the liquid crystal molecules are inclined by the pretilt angle in the predetermined direction with respect to the normal line of the substrate surface of the first substrate or the second substrate. The liquid crystal molecules are configured to maintain the pretilt when voltage is not applied thereto, and inclined so as to approach the substrate surface of the first substrate or the second substrate when voltage is applied thereto. Therefore, normally black-type display can be realized. Meanwhile, typically, it is preferable that the long axis of the pretilted liquid crystal molecule and one side of the first substrate or the second substrate be at a 45° angle with each other when viewed from the normal line direction of the first substrate or the second substrate. The first substrate and the second substrate are disposed to be interposed between a pair of polarization plates.

According to the aspect of the invention, in particular, when the interval between pixel electrodes adjacent to each other is s [μm], the thickness of the liquid crystal layer (that is, cell thickness) is d [μm], and the pretilt angle of the vertical alignment liquid crystal is $\theta[°]$, a relation equation $-1.6 \times s/d + 4.4 \leq \theta \leq -2.6 \times s/d + 5.6$ is satisfied.

Here, as the interval s between pixel electrodes adjacent to each other is small, the brightness of a display image can be improved, with the result that a transverse electric field generated between pixel electrodes adjacent to each other becomes large, so that the response speed of liquid crystal positioned around the end portion of the pixel electrode is reduced compared with the response speed of liquid crystal positioned around the center of the pixel electrode. Further, it can be considered that such a reduction of a response speed becomes more conspicuous as the cell thickness d increases compared to the interval s. That is, since the ratio of a transverse electric field to an electric field generated between the first substrate and the second substrate (in particular, between the pixel electrodes and the common electrode) becomes larger as the cell thickness d increases compared to the interval s, it can be considered that the response speed of the liquid crystal positioned around the end portion of the pixel electrodes is easily reduced, compared with the response speed of the liquid crystal positioned around the center of the pixel electrodes. On the other hand, the response speed of the liquid crystal becomes larger (that is, becomes high speed) as the pretilt angle θ increases, and becomes smaller (that is, becomes low speed) as the pretilt angle θ decreases. In other words, the response time of the liquid crystal is reduced the larger the pretilt angle θ is set, and becomes longer the small the pretilt angle θ is set. As described above, the reduction of the response speed of the liquid crystal positioned around the end portion of the pixel electrodes depends on the interval s, the cell thickness d, and the pretilt angle θ. There, according to research performed by the inventor of the present application, the relationship between the ratio s/d of the interval s to the cell thickness d and the pretilt angle θ is focused on, and the pretilt angle θ is determined based on the ratio s/d such that the above relation equation is satisfied, so that it is clear that the brightness of a display image can be improved and moving image blur can be reduced. That is, according to the first aspect of the invention, the brightness of a display image can be improved by reducing the interval s, and the pretilt angle θ to the extent that the moving image blur is not viewed can be determined based on the ratio s/d such that the above relation equation is satisfied. Therefore, there is a possibility that the brightness of a display image can be improved and moving image blur can be reduced.

As described above, according to the liquid crystal device according to the first aspect of the invention, there is a possibility that the brightness of a display image can be improved and moving image blur can be reduced.

An electronic apparatus according to second aspect of the invention includes the liquid crystal device according to the first aspect of the invention in order to solve the problem.

The electronic apparatus according to the second aspect includes the liquid crystal device according to the above-described first aspect of the invention, thereby implementing various kinds of electronic apparatus, such as a projection-type display apparatus, a television, a cellular phone, an electronic notebook, a word processor, a viewfinder-type or a monitor direct-view-type video tape recorder, a work station, a television telephone, a Point-Of-Sale (POS) terminal and a touch panel, which can perform high-definition display which is bright, and for which moving image blur is reduced.

The operation and other advantages of the invention will be clear from embodiments which are used to realize the invention and which will be described later.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the present invention will be described with reference to the accompanying drawings.

First Embodiment

A liquid crystal device according to a first embodiment will be described with reference to FIGS. 1 to 5.

Figure 1:
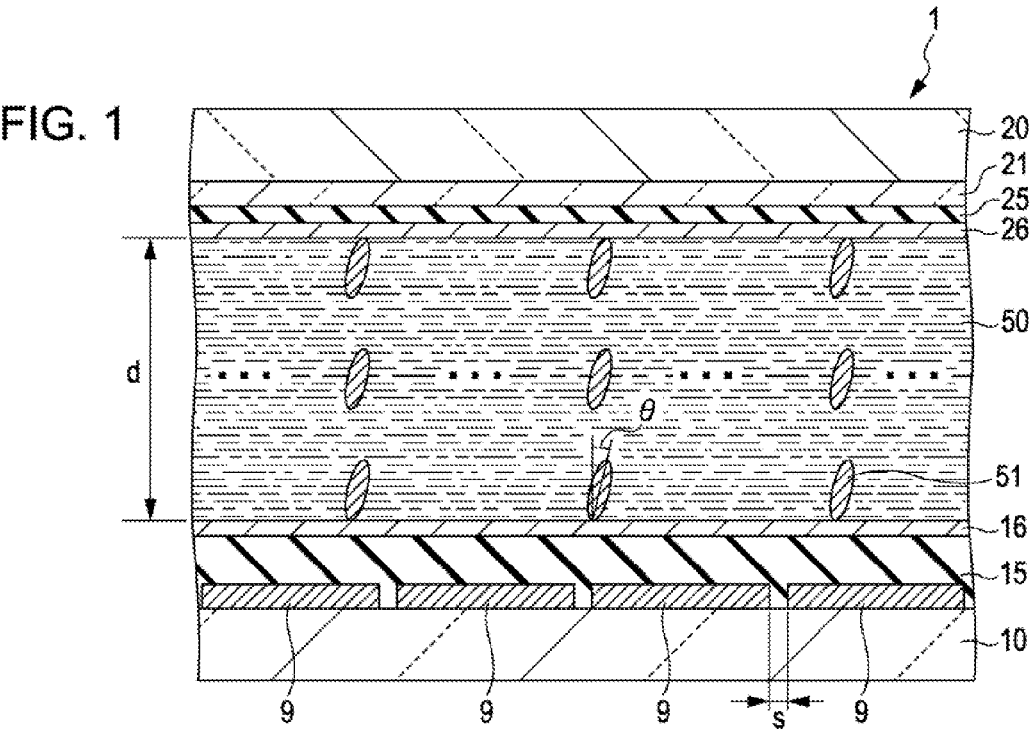
FIG. 1 is a cross-sectional view illustrating the configuration of a liquid crystal device according to a first embodiment.

FIG. 1 is a cross-sectional view illustrating the configuration of a liquid crystal device according to the first embodiment.

In FIG. 1, a liquid crystal device 1 according to the present embodiment is a VA-type liquid crystal device in which a liquid crystal layer 50 including vertical alignment liquid crystal is interposed between a Thin Film Transistor (TFT) array substrate 10 and an opposite substrate 20 which face each other. Meanwhile, the TFT array substrate 10 is an example of a "first substrate" according to the embodiment of the invention, and the opposite substrate 20 is an example of a "second substrate" according to the embodiment of the invention.

On the TFT array substrate 10, a laminated structure is formed in which a pixel switching TFT (Thin Film Transistor) and wirings, such as scanning lines and data lines. In the display area on the TFT array substrate 10, a plurality of pixel electrodes 9 are arranged at an interval of s with each other and in a matrix on the pixel switching TFT and the wirings, such as scanning lines and data lines. The pixel electrodes 9 include an aluminum (Al) film and reflect light incident from the side of the opposite substrate 20. A dielectric layer 15 formed of oxide silicon (SiO2) is provided on the upper layer side of the pixel electrodes 9. An alignment film 16 is provided on the dielectric layer 15. Meanwhile, in the present embodiment, the thickness of the pixel electrode 9 is approximately 150 nm, the thickness of the dielectric layer 15 is approximately 320 nm, and the thickness of the alignment film 16 is approximately 75 nm.

On the other hand, on the surface of the opposite substrate 20 which faces the TFT array substrate 10, a common electrode 21 formed of a transparent conductive material, such Indium Tin Oxide (ITO) or the like, is formed such that the common electrode 21 faces the plurality of pixel electrodes 9. A dielectric layer 25 formed of oxide silicon is provided on the common electrode 21. An alignment film 26 is provided on the dielectric layer 25. Meanwhile, in the present embodiment, the thickness of the common electrode 21 is approximately 140 nm, the thickness of the dielectric layer 25 is approximately 100 nm, and the thickness of the alignment film 26 is approximately 75 nm.

The liquid crystal layer 50 is formed from vertical alignment liquid crystal molecules, that is, liquid crystal molecules 51 that have negative dielectric constant anisotropy. Therefore, the liquid crystal device 1 is a VA-type liquid crystal device in which the alignment of the liquid crystal molecules 51 is controlled in a vertical alignment mode. The thickness d of the liquid crystal layer 50 (hereinafter, appropriately called "cell thickness d") is approximately 1.8 μm. The pretilt is given to the liquid crystal molecules 51 by the alignment film 16 or the alignment film 26. That is, liquid crystal molecules 51 are aligned while the liquid crystal molecules 51 are inclined by a pretilt angle θ in a predetermined direction with respect to the normal line of the substrate surface of the TFT array substrate 10 or the opposite substrate 20. When voltage is not applied between the pixel electrodes 9 and the common electrode 21, the liquid crystal molecules 51 maintain the pretilt, and, when voltage is applied between the pixel electrodes 9 and the common electrode 21, the liquid crystal molecules 51 are inclined in order to approach the substrate surface of the TFT array substrate 10 or the opposite substrate 20. Therefore, normally black-type display can be realized. Meanwhile, the long axis of the pretilted liquid crystal molecule 51 and one side of the TFT array substrate 10 or the opposite substrate 20 make an angle of 45° with each other, viewed from the normal line direction of the TFT array substrate 10 or the opposite substrate 20.

In the present embodiment, in particular, the interval s [μm] between the pixel electrodes 9 adjacent to each other, the cell thickness d [μm], and the pretilt angle θ[°] of the liquid crystal molecule 51 satisfy the relation equation $-1.6 \times s/d + 4.4 \leq \theta \leq -2.6 \times s/d + 5.6$.

According to research performed by the inventor of the present application, it becomes clear that the brightness of a display image can be improved and moving image blur can be reduced by determining the pretilt angle θ of the liquid crystal molecule 51 based on the ratio s/d of the interval s between the pixel electrodes 9 adjacent to each other to the cell thickness d so as to satisfy the relation equation.

Here, the feature of the relation equation will be described in detail.

Figure 2:
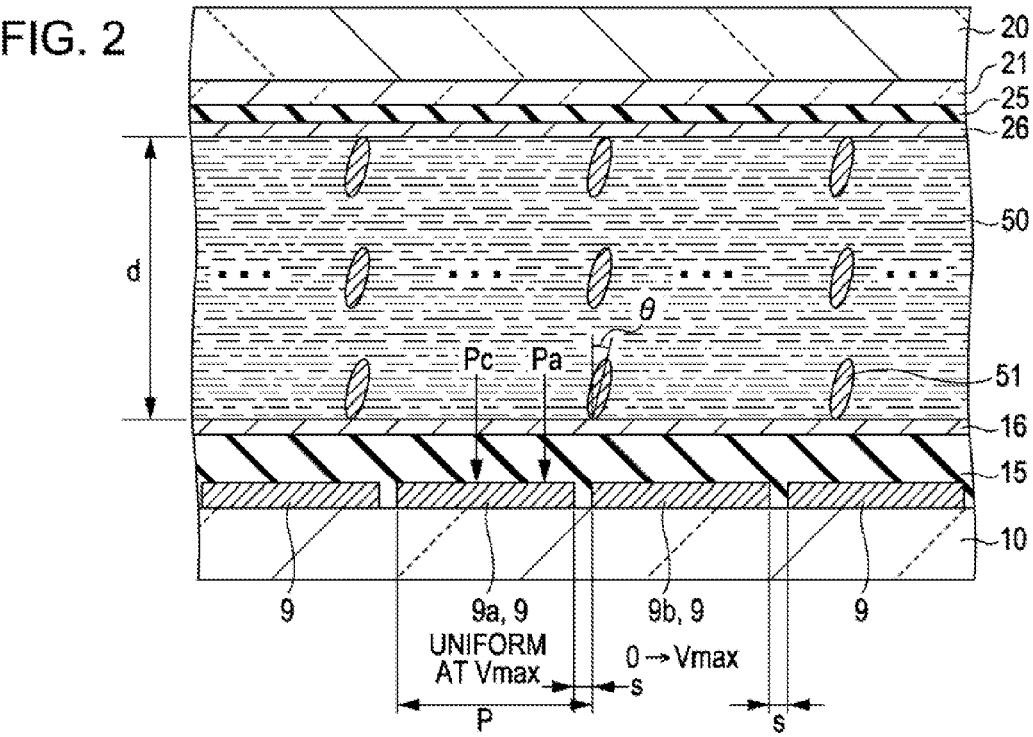
FIG. 2 is a schematic view illustrating the condition of a simulation.
Figure 3:
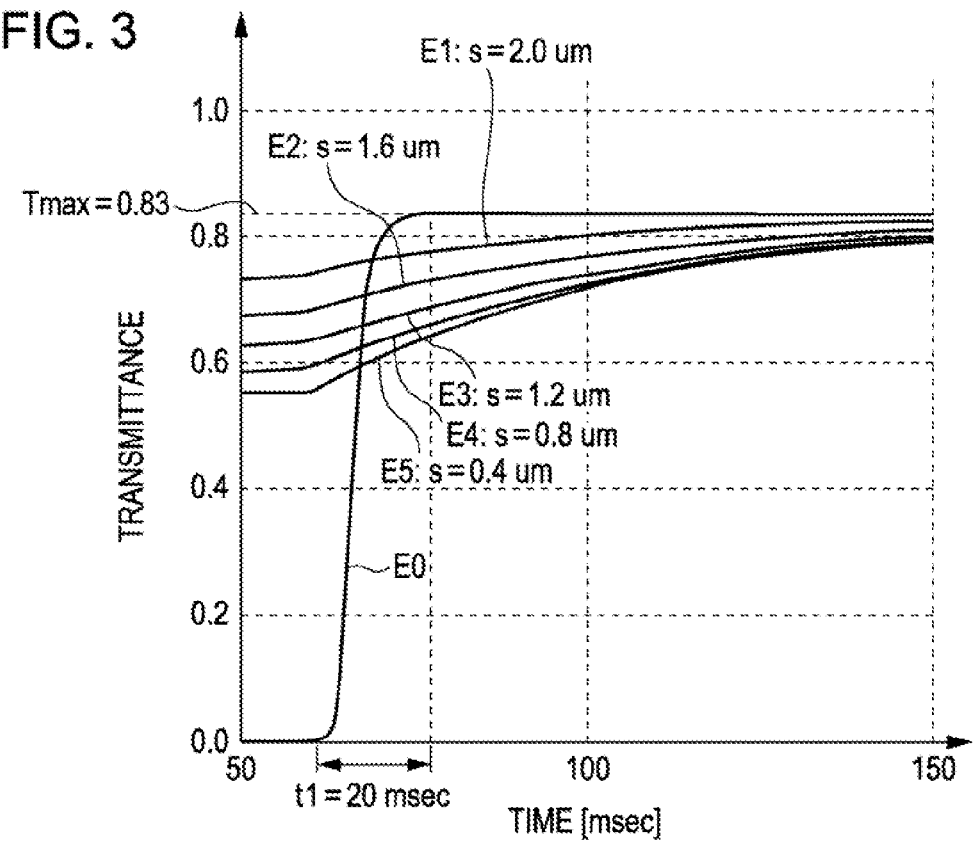
FIG. 3 is a graph illustrating the transient change in transmittance around the end portion of a pixel electrode.

FIG. 2 is a schematic view illustrating the conditions of a simulation, and FIG. 3 is a graph illustrating the transient change in the transmittance of the liquid crystal layer 50 at a predetermined portion Pa around the end portion of the pixel electrode 9 when a simulation which uses the interval s between the pixel electrodes 9 adjacent to each other as a parameter is performed. Meanwhile, FIG. 2 is illustrated so as to correspond to FIG. 1.

In FIGS. 2 and 3, graphs E1 to E5 (refer to FIG. 3) display the transient change in the transmittance of the liquid crystal layer 50 at a predetermined position Pa around the end portion of a pixel electrode 9a (in more detail, a position which deviates toward the center Pc of the pixel electrode 9a from the end portion of the side of the pixel electrode 9b of the pixel electrode 9a by 2.6 μm) when voltage to be applied between a pixel electrode 9b adjacent to the pixel electrode 9a and the common electrode 21 is changed from 0 (zero, that is, the state in which voltage is not applied) to a maximum voltage Vmax in the state where voltage, applied between the pixel electrode 9a and the common electrode 21, is set to be uniform at the maximum voltage Vmax. The graph E1 indicates the transient change in transmittance when the interval s is 2.0 μm. The graph E2 indicates the transient change in transmittance when the interval s is 1.6 μm. The graph E3 indicates the transient change in transmittance when the interval s is 1.2 μm. The graph E4 indicates the transient change in transmittance when the interval s is 0.8 μm. The graph E5 indicates the transient change in transmittance when the interval s is 0.4 μm. Further, the graph E0 indicates the transient change in the transmittance of the liquid crystal layer 50 at the center Pc of the pixel electrode 9a. Meanwhile, in FIG. 2, the arrangement pitch P of the pixel electrode 9 is uniform at approximately 8.4 μm.

As indicated by the graphs E1 to E5 of FIG. 3, the response speed of the liquid crystal at the predetermined position Pa around the end of the pixel electrode 9a is reduced as the interval s between the pixel electrodes 9 adjacent to each other decreases. That is, as the interval s between the pixel electrodes 9 adjacent to each other decreases, the brightness of a display image can be improved but the transverse electric field generated between the pixel electrodes 9 adjacent to each other becomes larger, so that the response speed of the liquid crystal molecule 51 positioned around the end portion of the pixel electrode 9 is reduced, compared with the response speed of the liquid crystal molecule 51 positioned around the center of the pixel electrode 9. Further, it is considered that such reduction of the response speed becomes more conspicuous as the cell thickness d increases compared to the interval s. That is, it is considered that, since the ratio of the transverse electric field to the electric field generated between the pixel electrode 9 and the common electrode 21 becomes larger as the thickness d increases compared to the interval s, the response speed of the liquid crystal positioned around the end portion of the pixel electrode is easily reduced compared with the response speed of the liquid crystal positioned around the center of the pixel electrode 9.

Figure 4:
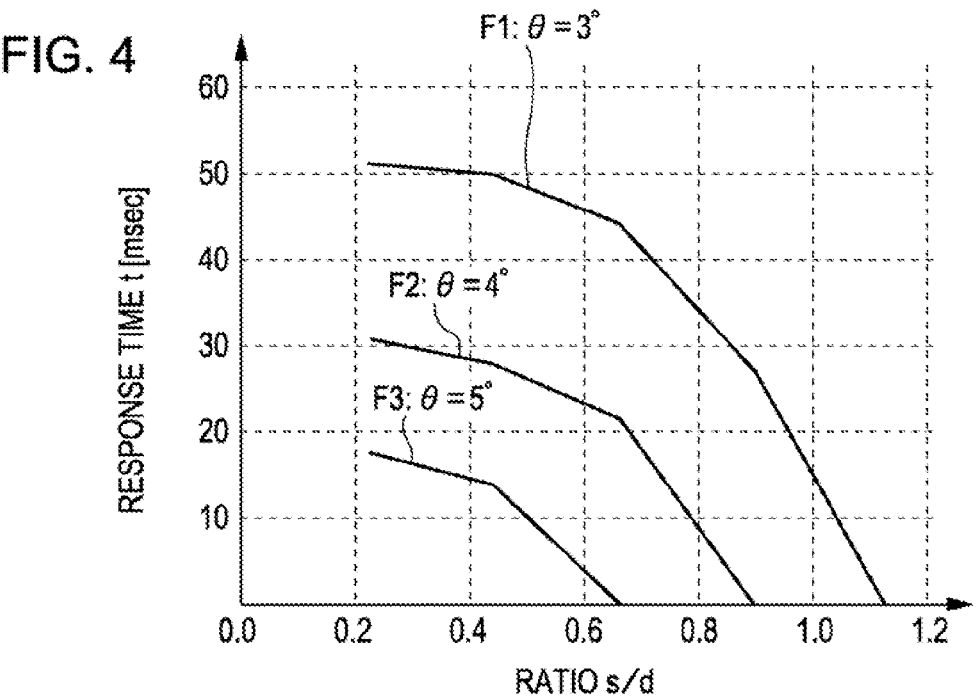
FIG. 4 is a graph illustrating the relationship between a ratio s/d and the response time t of a liquid crystal layer around the end portion of the pixel electrode.

FIG. 4 is a graph illustrating the relationship between a ratio s/d of the interval s to the cell thickness d and the response time t [ms] of the liquid crystal layer 50 at the predetermined position Pa around the end portion of the pixel electrode 9. Meanwhile, the response time t indicates the time from when the voltage Vmax is applied between the pixel electrode 9 and the common electrode 21 until the transmittance of the liquid crystal layer 50 at the predetermined position Pa around the end portion of the pixel electrode 9 becomes 0.9 times the maximum transmittance Tmax (refer to FIG. 3).

In FIG. 4, a graph F1 indicates the relationship between the ratio s/d and the response time t when the pretilt angle θ is 3°. A graph F2 indicates the relationship between the ratio s/d and the response time t when the pretilt angle θ is 4°. A graph F3 indicates the relationship between the ratio s/d and the response time t when the pretilt angle θ is 5°.

As indicated by the graphs F1 to F3 of FIG. 4, the response time t of the liquid crystal layer 50 at the predetermined position Pa around the end portion of the pixel electrode 9 becomes shorter as the pretilt angle θ increases, and becomes longer as the pretilt angle θ decreases. That is, the response speed of the liquid crystal molecule 51 included in the liquid crystal layer 50 increases (that is, becomes a high speed) as the pretilt angle θ becomes larger, and decreases (that is, becomes a low speed) as the pretilt angle θ becomes smaller.

Here, as indicated by the graph E0 of FIG. 3, a response time t1 until the transmittance of the liquid crystal layer 50 at the center Pc of the pixel electrode 9 becomes the maximum transmittance Tmax is 20 ms. Therefore, even if the response time t of the liquid crystal layer 50 at the predetermined position Pa around the end portion of the pixel electrode 9 is equal to or larger than 20 msec the same as the response time t1, it can be considered that moving image blur is hardly viewed or is not viewed at all if the response time t is equal to or less than 30 msec which is 1.5 times the response time t1.

Figure 5:
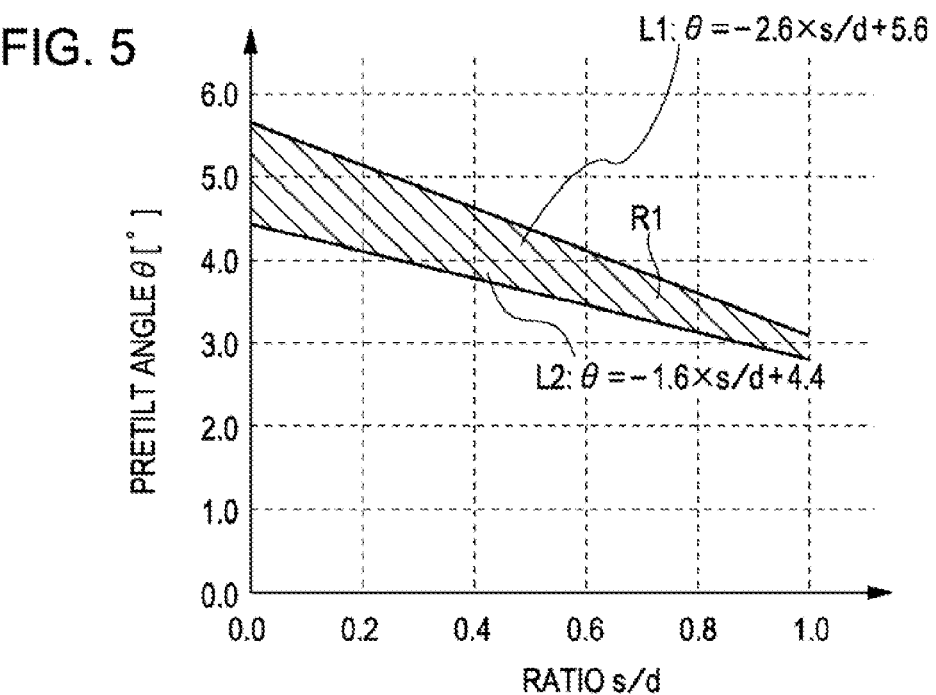
FIG. 5 is a view illustrating the relationship between a ratio s/d and a pretilt angle θ, which makes a response time t be uniform.

FIG. 5 is a view illustrating the relationship between the ratio s/d and the pretilt angle θ, which makes the response time t be uniform.

In FIG. 5, a straight line L1 is a straight line which illustrates the relationship between the ratio s/d and the pretilt angle θ, in which the response time t of the liquid crystal layer 50 at the predetermined position Pa around the end portion of the pixel electrode 9 becomes 20 msec. A straight line L2 is a straight line which illustrates the relationship between the ratio s/d and the pretilt angle θ, in which the response time t of the liquid crystal layer 50 at the predetermined position Pa around the end portion of the pixel electrode 9 becomes 30 msec.

The straight line L1 is expressed by the equation $\theta=-2.6\times s/d+5.6$. The straight line L2 is expressed by the equation $\theta=-1.6\times s/d+4.4$. The straight line L1 and the straight line L2 can be gained by obtaining the ratio s/d corresponding to the response time t which becomes 20 msec and the ratio s/d corresponding to the response time t which becomes 30 msec for the respective pretilt angles $\theta$ based on the graphs F1 to F3 of FIG. 4.

Therefore, in FIG. 5, if the ratio s/d and the pretilt angle $\theta$ exist within an area R1 between the straight line L1 and the straight line L2, the response time t of the liquid crystal layer 50 around the end portion of the pixel electrode 9 becomes a value between 20 msec and 30 msec, and moving image blur can be reduced.

That is, moving image blur can be reduced by satisfying the relation equation $-1.6\times s/d+4.4 \leq \theta \leq -2.6\times s/d+5.6$. Here, since the brightness of the display image can be improved by making the interval s smaller, the brightness of the display image can be improved and moving image blur can be reduced by determining the pretilt angle $\theta$ while making the interval s smaller such that the relation equation is satisfied.

Figure 6:
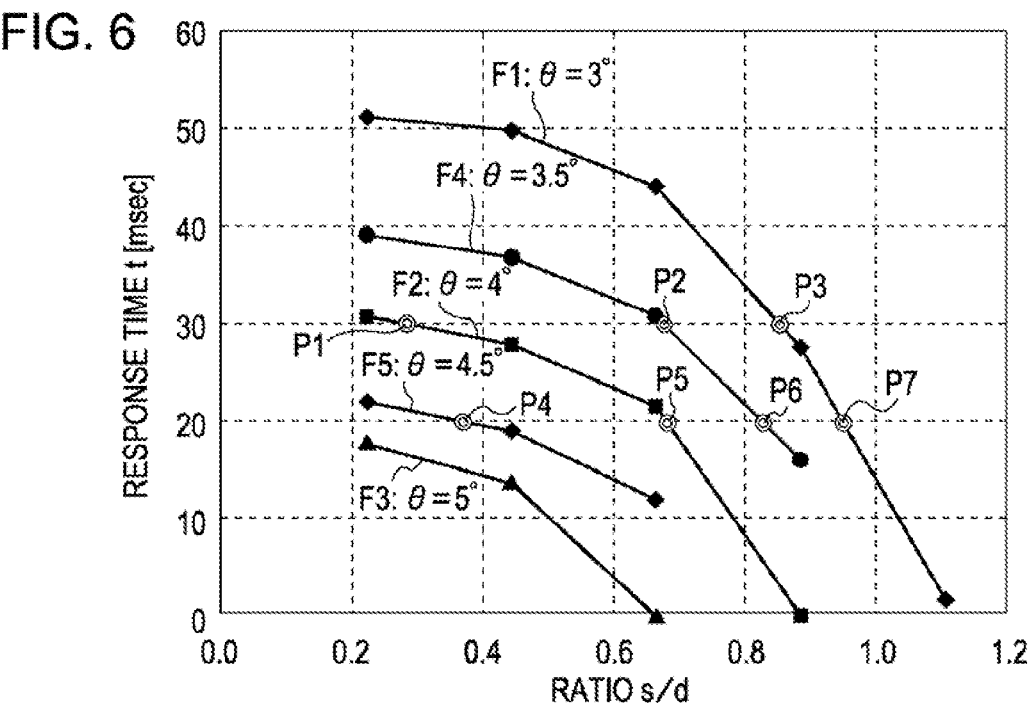
FIG. 6 is a graph illustrating the relationship between the ratio s/d and the response time t of the liquid crystal layer around the end portion of the pixel electrode.

FIG. 6 is a graph having the same gist as that of FIG. 4, and illustrating in detail the relationship between the ratio s/d of the interval s to the cell thickness d and the response time t [ms] of the liquid crystal layer 50 at the predetermined position Pa around the end portion of the pixel electrode 9. Meanwhile, the response time t is the time from when voltage Vmax is applied between the pixel electrode 9 and the common electrode 21 until the transmittance of the liquid crystal layer 50 at the predetermined position Pa around the end portion of the pixel electrode 9 becomes 0.9 times the maximum transmittance Tmax (refer to FIG. 3).

In FIG. 6, a graph F1 indicates the relationship between the ratio s/d and the response time t when the pretilt angle $\theta$ is 3° as in FIG. 4. A graph F2 indicates the relationship between the ratio s/d and the response time t when the pretilt angle $\theta$ is 4° as in FIG. 4. A graph F3 indicates the relationship between the ratio s/d and the response time t when the pretilt angle $\theta$ is 5° as in FIG. 4. A graph F4 indicates the relationship between the ratio s/d and the response time t when the pretilt angle $\theta$ is 3.5°. A graph F5 indicates the relationship between the ratio s/d and the response time t when the pretilt angle $\theta$ is 4.5°.

The graphs F1 to F5 are obtained by plotting the response time t obtained by performing a simulation using the ratio s/d as a parameter in the plane of coordinates which have the ratio s/d as a horizontal axis and the response time t as a longitudinal axis.

As indicated by the graphs F1 to F5 of FIG. 6, the response time t of the liquid crystal layer 50 at the predetermined position Pa around the end portion of the pixel electrode 9 decreases as the pretilt angle $\theta$ becomes larger, and increases as the pretilt angle $\theta$ becomes smaller. That is, the response speed of the liquid crystal molecules 51 included in the liquid crystal layer 50 increases (that is, becomes high speed) as the pretilt angle $\theta$ becomes larger, and decreases (that is, becomes low speed) as the pretilt angle $\theta$ becomes smaller.

In FIG. 6, points P1, P2, and P3 are points that indicate the ratio s/d when the response time t becomes 30 msec. That is, the point P1 is the intersection between the graph F2 and a straight line indicating that the response time t is 30 [ms], the point P2 is the intersection between the graph F4 and the straight line indicating that the response time t is 30 [ms], and the point P3 is the intersection between the graph F1 and the straight line indicating that the response time t is 30 [ms]. Points P4, P5, P6, and P7 are points that indicate the ratio s/d when the response time t becomes 20 msec. That is, the point P4 is the intersection between the graph F5 and the straight line indicating that the response time t is 20 [ms], the point P5 is the intersection between the graph F1 and the straight line indicating that the response time t is 20 [ms], and the point P6 is the intersection between the graph F4 and the straight line indicating that the response time t is 20 [ms]. The point P7 is the intersection between the graph F1 and the straight line indicating that the response time t is 20 [ms].

Figure 7:
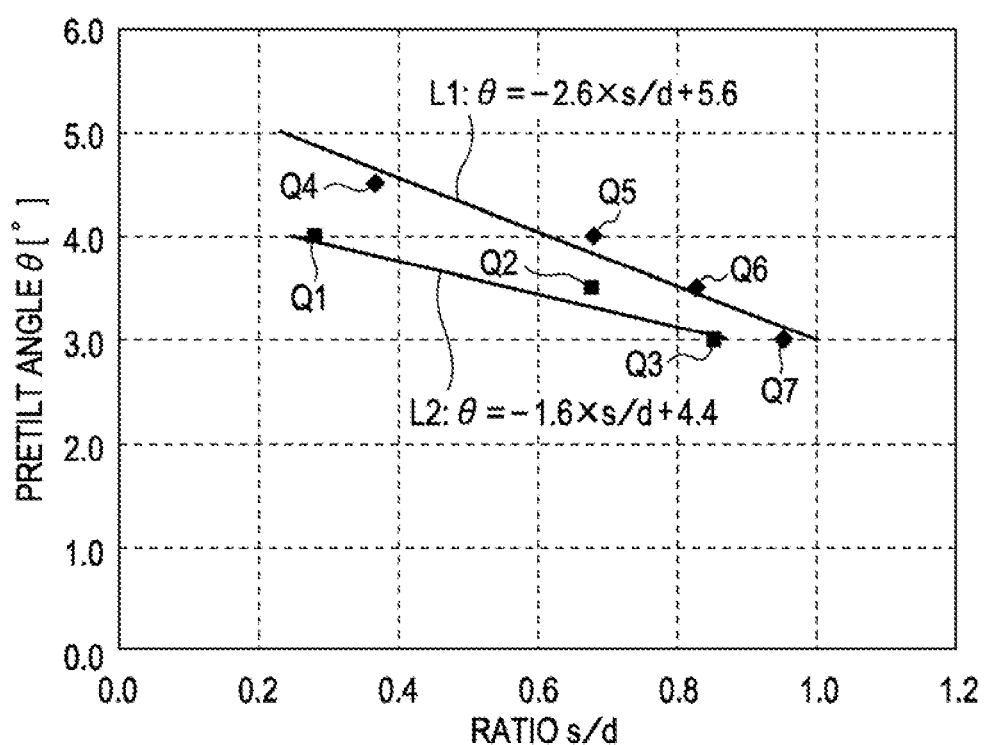
FIG. 7 is a view illustrating the relationship between the ratio s/d and the pretilt angle θ, which makes the response time t be uniform.

FIG. 7 is a view having the same gist as that of FIG. 5, and illustrating the relationship between the ratio s/d and the pretilt angle $\theta$, which makes the response time t be uniform.

In FIG. 7, a straight line L1 is a straight line that illustrates the relationship between the ratio s/d and the pretilt angle $\theta$ in which the response time t of the liquid crystal layer 50 at the predetermined position Pa around the end portion of the pixel electrode 9 becomes 20 msec as in FIG. 5. A straight line L2 is a straight line that illustrates the relationship between the ratio s/d and the pretilt angle $\theta$ in which the response time t of the liquid crystal layer 50 at the predetermined position Pa around the end portion of the pixel electrode 9 becomes 30 msec as in FIG. 5.

The straight line L1 is expressed by the equation $\theta=-2.6\times s/d+5.6$. The straight line L2 is expressed by the equation $\theta=-1.6\times s/d+4.4$. The straight line L1 and the straight line L2 can be gained by obtaining the ratio s/d corresponding to the response time t which becomes 20 msec and the ratio s/d corresponding to the response time t which becomes 30 msec for the respective pretilt angles $\theta$ based on the graphs F1 to F5 of FIG. 6. In particular, in FIG. 7, a point Q1 is a point corresponding to the point P1 ($\theta=4°$ and t=30 msec) shown in FIG. 6, a point Q2 is a point corresponding to the point P2 ($\theta=3.5°$ and t=30 msec) shown in FIG. 6, and a point Q3 is a point corresponding to the point P3 ($\theta=3°$ and t=30 msec) shown in FIG. 6. Further, a point Q4 is a point corresponding to the point P4 ($\theta=4.5°$ and t=20 msec) shown in FIG. 6, a point Q5 is a point corresponding to the point P5 ($\theta=4°$ and t=20 msec) shown in FIG. 6, a point Q6 is a point corresponding to the point P6 ($\theta=3.5°$ and t=20 msec) shown in FIG. 6, and a point Q7 is a point corresponding to the point P7 ($\theta=3°$ and t=20 msec) shown in FIG. 6. The straight line L1 is an approximate straight line (regression line) obtained based on the points Q4, Q5, Q6, and Q7 at which the response time t is 20 msec, and the straight line L2 is an approximate straight line obtained based on the points Q1, Q2, and Q3 at which the response time t is 30 msec.

Meanwhile, if, when the relationship between the ratio s/d and the pretilt angle $\theta$ is approximated using a secondary or higher degree of polynomial equation based on the points Q4, Q5, Q6, and Q7 (or based on the points Q1, Q2, and Q3), for example, the cell thickness d is uniform, the pretilt angle $\theta$ becomes smaller as the interval s decreases in the range in which the interval s is smaller than a predetermined value. This conflicts with the fact that a pretilt angle $\theta$ should increase as the interval s becomes smaller (that is, as the interval s becomes smaller, the response speed of liquid crystal is reduced due to a transverse electric field generated between pixel electrodes adjacent to each other, so that the response speed of the liquid crystal should be increased by setting the pretilt angle $\theta$ to be large). Therefore, the inventors of the present application gained the relationship between the ratio s/d and the pretilt angle $\theta$ by performing linear approximation on the points Q4, Q5, Q6, and Q7 (or, the points Q1, Q2, and Q3).

Therefore, if the ratio s/d and the pretilt angle $\theta$ are positioned within area between the straight line L1 and the straight line L2, the response time t of the liquid crystal layer 50 around the end portion of the pixel electrode 9 becomes a value between 20 msec to 30 msec, thereby reducing moving image blur.

That is, the moving image blur can be reduced by satisfying the relation equation $-1.6\times s/d+4.4 \leq \theta \leq -2.6\times s/d+5.6$. Here, since the brightness of a display image can be improved by reducing the interval s, the brightness of a display image can be improved and moving image blur can be reduced by determining the pretilt angle θ while reducing the interval s such that the relation equation is satisfied.

Meanwhile, in the present embodiment, the simulation is performed in such a way that the thickness of the pixel electrode 9 is set to approximately 150 nm, the thickness of the dielectric layer 15 is set to approximately 320 nm, the thickness of the alignment film 16 is set to approximately 75 nm, the thickness of the common electrode 21 is set to approximately 140 nm, the thickness of the dielectric layer 25 is set to approximately 100 nm, and the thickness of the alignment film 26 is set to approximately 75 nm, respectively. However, even if the simulation is performed by changing these set values, the relation equation $-1.6\times s/d+4.4 \leq \theta \leq -2.6\times s/d+5.6$ can be obtained. That is, the advantages according to the embodiments of the invention, which can be obtained by satisfying the relation equation $-1.6\times s/d+4.4 \leq \theta \leq -2.6\times s/d+5.6$, are not limited to the set values of the simulation of the present embodiment.

As described above, according to the liquid crystal device 1 according to the present embodiment, the interval s between the pixel electrodes 9 adjacent to each other, the cell thickness d, the pretilt angle θ of the liquid crystal molecule 51 satisfy the relation equation $-1.6\times s/d+4.4 \leq \theta \leq -2.6\times s/d+5.6$, so that the brightness of a display image can be improved and moving image blur can be reduced.

Electronic Apparatus

Next, a case where the above-described liquid crystal device is applied to an electronic apparatus will be described. Here, a projection-type liquid crystal projector is exemplified as an electronic apparatus according to an embodiment of the invention.

Figure 8:
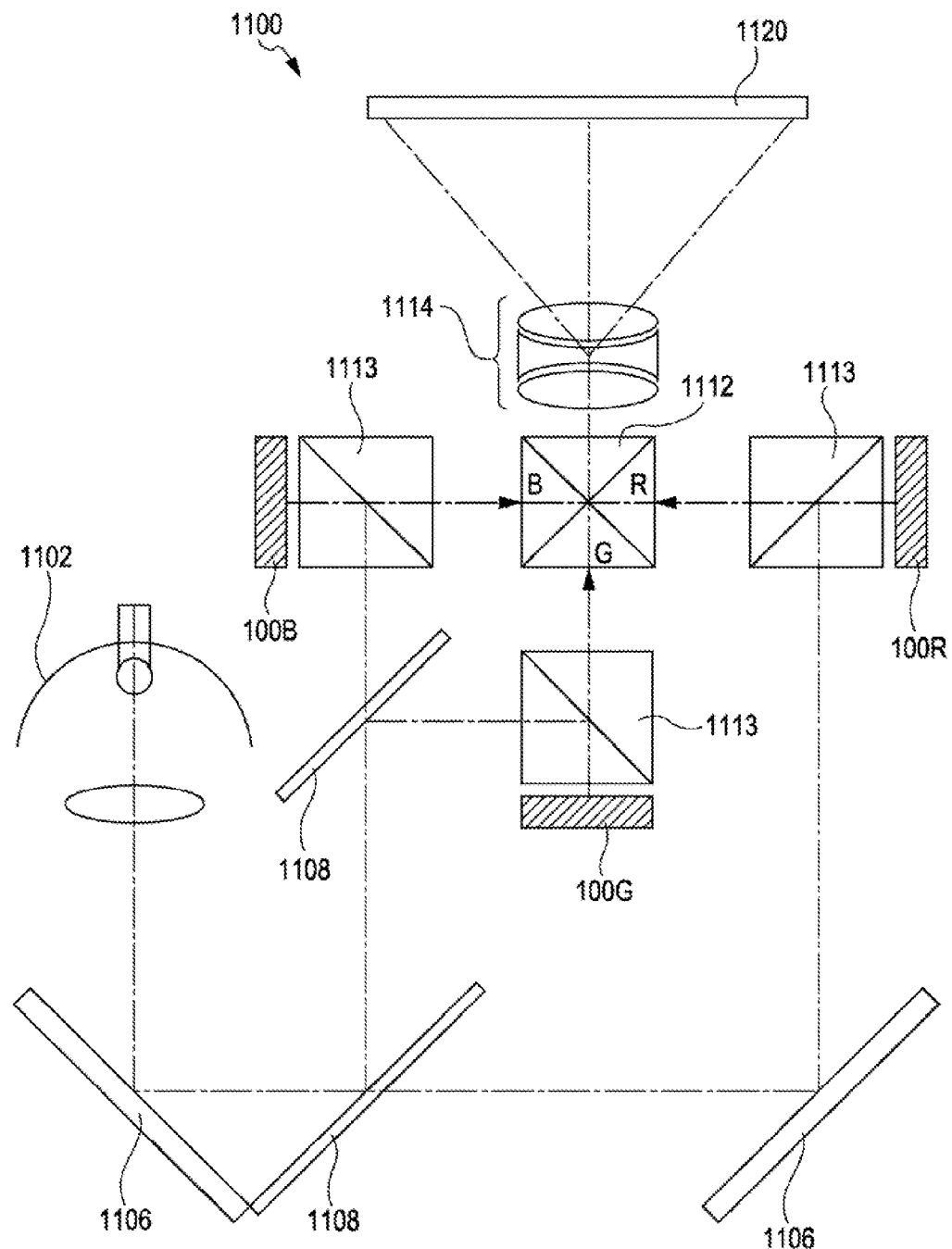
FIG. 8 is a schematic cross-sectional view illustrating a liquid crystal projector which is an example of an electronic apparatus to which the liquid crystal device according to the embodiment of the present invention is applied.

FIG. 8 is a schematic cross-sectional view of a projection-type liquid crystal projector according to the present embodiment.

In FIG. 8, a liquid crystal projector 1100 is constructed as a multiple-plate type color projector which uses three RGB liquid crystal light valves 100R, 100G, and 100B for the respective R, G, and B. The above-described liquid crystal device is used as each of the liquid crystal light valves 100R, 100G, and 100B.

As shown in FIG. 8, in the liquid crystal projector 1100, if projection light is emitted from a lamp unit 1102 of a white light source, such as a metal halide lamp or the like, the projection light is divided into light components R, G, and B corresponding to the three primary colors RGB using two mirrors 1106, two dichroic mirrors 1108, and three polarization beam splitters (PBSs) 1113, and then the light components are respectively guided to the liquid crystal light valves 100R, 100G, and 100B which correspond to the respective colors. Meanwhile, at this time, lenses may be appropriately provided at an intermediate location in the light paths in order to prevent light loss in the light paths. In addition, light components corresponding to the three primary colors respectively modulated by the liquid crystal light valves 100R, 100G, and 100B are combined by a cross prism 1112, and then projected on a screen 1120 as a color image through a projection lens 1114.

Meanwhile, since light corresponding to each of the primary colors R, G, and B is incident on each of liquid crystal panels 1110R, 1110B, and 1110G by the dichroic mirror 1108 and the polarization beam splitter 1113, providing a color filter is not necessary.

Meanwhile, in addition to the electronic apparatus described with reference to FIG. 8, a mobile-type personal computer, a cellular phone, a liquid crystal television, a viewfinder-type or monitor direct-view-type video tape recorder, a car navigation apparatus, a pager, an electronic notebook, a calculator, a word processor, a work station, a television telephone, a Point-Of-Sale (POS) terminal, a device having a touch panel, or the like may be included. In addition, it goes without saying that the embodiment of the invention can be applied to these various kinds of electronic apparatus.

The present invention is not limited to the above-described embodiments, and may be appropriately modified in the range that does not violate the gist or scope of the invention implied on the above-described aspects and the whole specification, and a liquid crystal device on which such modification is performed and an electronic apparatus including the corresponding liquid crystal device are included in the technical range of the present invention.

What is claimed is:

1. A liquid crystal device comprising:
   a first substrate;
   a second substrate disposed to face the first substrate;
   a plurality of pixel electrodes arranged between the first substrate and the second substrate with intervals between adjacent pixel electrodes of the plurality of pixel electrodes; and
   a liquid crystal layer interposed between the plurality of pixel electrodes and the second substrate, and configured to include a vertical alignment liquid crystal,
   wherein a relation equation $-1.6\times s/d+4.4 \leq \theta \leq -2.6\times s/d+5.6$ is satisfied, where s is an interval distance of the intervals between the adjacent pixel electrodes, d is a thickness of the liquid crystal layer, and θ is a pretilt angle of the vertical alignment liquid crystal.

2. An electronic apparatus comprising the liquid crystal device according to claim 1.

3. The liquid crystal device according to claim 1, wherein the interval distance s is in a range of from approximately 0.4 µm to approximately 2.0 µm.

4. The liquid crystal device according to claim 1, wherein the pretilt angle θ of the vertical alignment liquid crystal is in a range of from approximately 3° to approximately 5°.

5. The liquid crystal device according to claim 1, further comprising
   a first dielectric layer interposed between the liquid crystal layer and the first substrate; and
   a second dielectric layer interposed between the liquid crystal layer and the second substrate.

6. A liquid crystal device comprising:
   a first substrate;
   a second substrate disposed to face the first substrate;
   a plurality of pixel electrodes disposed on the first substrate, a first pixel electrode among the plurality of pixel electrodes and a second pixel electrode among the plurality of pixel electrodes that is disposed adjacent to the first pixel electrode having a space therebetween; and
   a liquid crystal layer interposed between the plurality of pixel electrodes and the second substrate, the liquid crystal layer including a vertical alignment liquid crystal,
   wherein, defining a pretilt angle of the vertical alignment liquid crystal as θ (degree), a distance of the space as s (micro meters), and a thickness of the liquid crystal layer as d (micro meters), the θ, the s, and the d satisfy a following equation:

$$-1.6 \times s/d + 4.4 \leq \theta \leq -2.6 \times s/d + 5.6.$$

7. The liquid crystal device according to claim 6, further comprising:

a common electrode disposed on a liquid crystal layer side of the second substrate.

\* \* \* \* \*